United States Patent
Trombetta et al.

(10) Patent No.: US 10,751,623 B2
(45) Date of Patent: Aug. 25, 2020

(54) INCENTIVIZING PLAYERS TO ENGAGE IN COMPETITIVE GAMEPLAY

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US); James Fairbairn, Novato, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 80 days.

(21) Appl. No.: 15/908,438

(22) Filed: Feb. 28, 2018

(65) Prior Publication Data

US 2019/0262713 A1    Aug. 29, 2019

(51) Int. Cl.

| A63F 13/00 | (2014.01) |
| A63F 13/533 | (2014.01) |
| A63F 13/798 | (2014.01) |
| A63F 13/795 | (2014.01) |
| A63F 13/35 | (2014.01) |

(52) U.S. Cl.
CPC ............ *A63F 13/533* (2014.09); *A63F 13/35* (2014.09); *A63F 13/795* (2014.09); *A63F 13/798* (2014.09)

(58) Field of Classification Search
CPC ...... A63F 13/533; A63F 13/35; A63F 13/795; A63F 13/798
See application file for complete search history.

(56) References Cited

U.S. PATENT DOCUMENTS

| 5,729,471 A | 3/1998 | Jain et al. |
| 5,995,518 A | 11/1999 | Burns et al. |
| 6,415,317 B1 | 7/2002 | Yelon et al. |

(Continued)

FOREIGN PATENT DOCUMENTS

| WO | WO 2014/109435 | 7/2014 |
| WO | WO 2018/160274 | 9/2018 |

(Continued)

OTHER PUBLICATIONS

PCT Application No. PCT/US2019/015120 International Search Report and Written Opinion dated Apr. 15, 2019.

(Continued)

*Primary Examiner* — Omkar A Deodhar
*Assistant Examiner* — Shauna-Kay Hall
(74) *Attorney, Agent, or Firm* — Polsinelli LLP

(57) ABSTRACT

Techniques for incentivizing completive gameplay include measuring metrics for a plurality of players (e.g., ranked players and non-ranked players) that engage in gameplay, and generating ranked profiles for the ranked players and a non-ranked profile for the non-ranked player based on the metrics. The techniques further include mapping the ranked profiles and the non-ranked profile in a vector-space, where one metric corresponds to one dimension in the vector-space, and presenting a notification to the non-ranked player based on a distance in the vector-space between the non-ranked profile and at least one ranked profile. The notification provides an incentive for the non-ranked player to engage in competitive gameplay.

20 Claims, 8 Drawing Sheets

(56) References Cited

U.S. PATENT DOCUMENTS

| | | |
|---|---|---|
| 6,631,522 B1 | 10/2003 | Erdelyi |
| 6,877,134 B1 | 4/2005 | Fuller et al. |
| 7,499,475 B2 | 3/2009 | Kashiwagi et al. |
| 8,025,572 B2 | 9/2011 | Spanton et al. |
| 8,187,104 B2 | 5/2012 | Pearce |
| 8,202,167 B2 | 6/2012 | Ackely et al. |
| 8,645,844 B1 | 2/2014 | Strobel et al. |
| 9,233,305 B2 | 1/2016 | Laakkonen et al. |
| 9,473,825 B2 | 10/2016 | Gossweiler et al. |
| 9,782,678 B2 | 10/2017 | Long et al. |
| 9,860,477 B2 | 1/2018 | Kummer et al. |
| 9,968,856 B1 | 5/2018 | Ninoles et al. |
| 10,471,360 B2 | 11/2019 | Trombetta |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0147306 A1 | 7/2004 | Randall et al. |
| 2004/0189701 A1 | 9/2004 | Badt |
| 2004/0266535 A1 | 12/2004 | Reeves |
| 2006/0105827 A1 | 5/2006 | Metzger et al. |
| 2006/0247060 A1* | 11/2006 | Hanson .............. G07F 17/32 463/42 |
| 2007/0018952 A1 | 1/2007 | Arseneau et al. |
| 2007/0021058 A1 | 1/2007 | Aresneau et al. |
| 2007/0070914 A1 | 3/2007 | Abigail |
| 2007/0117635 A1 | 5/2007 | Spanton et al. |
| 2007/0248261 A1 | 10/2007 | Zhou et al. |
| 2008/0113815 A1 | 5/2008 | Weingardt et al. |
| 2008/0200254 A1 | 8/2008 | Cayce et al. |
| 2009/0036214 A1 | 2/2009 | Dahl |
| 2009/0208181 A1 | 8/2009 | Cottrell |
| 2009/0225828 A1 | 9/2009 | Perlman et al. |
| 2009/0271821 A1 | 10/2009 | Zalewski |
| 2010/0099330 A1 | 4/2010 | Digiovanni |
| 2010/0240443 A1* | 9/2010 | Baerlocher .......... G07F 17/32 463/25 |
| 2011/0207523 A1* | 8/2011 | Filipour .............. G07F 17/32 463/25 |
| 2011/0263332 A1 | 10/2011 | Mizrachi |
| 2011/0263333 A1 | 10/2011 | Dokei et al. |
| 2011/0275431 A1 | 11/2011 | Hirzel et al. |
| 2012/0093481 A1 | 4/2012 | McDowell et al. |
| 2012/0283017 A1 | 11/2012 | Ahiska et al. |
| 2013/0002949 A1 | 1/2013 | Raveendran et al. |
| 2013/0007013 A1 | 1/2013 | Geisner et al. |
| 2013/0123019 A1 | 5/2013 | Sullivan et al. |
| 2013/0254680 A1* | 9/2013 | Buhr .................... A63F 13/61 715/753 |
| 2013/0296051 A1 | 11/2013 | Gault et al. |
| 2013/0324239 A1 | 12/2013 | Ur et al. |
| 2014/0004951 A1 | 1/2014 | Kern et al. |
| 2014/0087846 A1 | 3/2014 | Bryan et al. |
| 2014/0087851 A1 | 3/2014 | Low et al. |
| 2014/0142921 A1 | 5/2014 | Gleadall et al. |
| 2014/0171039 A1 | 6/2014 | Bjontegard |
| 2014/0171182 A1 | 6/2014 | Versaci |
| 2014/0274307 A1 | 9/2014 | Gonzalez |
| 2014/0274370 A1 | 9/2014 | Shah |
| 2014/0297408 A1 | 10/2014 | Zabala |
| 2015/0005052 A1* | 1/2015 | Harrington ........... A63F 13/795 463/25 |
| 2015/0011283 A1 | 1/2015 | Sanford et al. |
| 2015/0018990 A1 | 1/2015 | Shachar et al. |
| 2015/0113548 A1 | 4/2015 | Stern et al. |
| 2015/0141140 A1 | 5/2015 | Lampe et al. |
| 2015/0248792 A1 | 9/2015 | Abovitz et al. |
| 2015/0281029 A1 | 10/2015 | Callahan et al. |
| 2015/0348373 A1 | 12/2015 | Weingardt et al. |
| 2015/0375117 A1 | 12/2015 | Thompson et al. |
| 2016/0051895 A1 | 2/2016 | Hood |
| 2016/0310843 A1 | 10/2016 | Webb |
| 2016/0365121 A1 | 12/2016 | DeCaprio |
| 2017/0001111 A1 | 1/2017 | Willette et al. |
| 2017/0001112 A1 | 1/2017 | Gilmore et al. |
| 2017/0003740 A1 | 1/2017 | Verfaillie et al. |
| 2017/0006074 A1 | 1/2017 | Oates |
| 2017/0072324 A1 | 3/2017 | Navok et al. |
| 2017/0113143 A1 | 4/2017 | Marr |
| 2017/0157512 A1 | 6/2017 | Long et al. |
| 2017/0266549 A1 | 9/2017 | Paradise |
| 2017/0266552 A1 | 9/2017 | Paradise et al. |
| 2017/0270751 A1 | 9/2017 | Paradise |
| 2017/0304724 A1 | 10/2017 | Cotter |
| 2017/0332131 A1 | 11/2017 | Opsenica et al. |
| 2018/0077438 A1 | 3/2018 | Hensen et al. |
| 2018/0139257 A1 | 5/2018 | Ninoles et al. |
| 2018/0192144 A1 | 7/2018 | McElroy |
| 2018/0250598 A1 | 9/2018 | Trombetta |
| 2018/0250600 A1 | 9/2018 | Trombetta |
| 2019/0262705 A1 | 8/2019 | Trombetta |
| 2019/0262706 A1 | 8/2019 | Trombetta |
| 2019/0262712 A1 | 8/2019 | Trombetta |
| 2019/0262717 A1 | 8/2019 | Thielbar |
| 2019/0262720 A1 | 8/2019 | Trombetta |
| 2019/0262723 A1 | 8/2019 | Trombetta |
| 2019/0262724 A1 | 8/2019 | Trombetta |
| 2019/0262727 A1 | 8/2019 | Trombetta |
| 2019/0266845 A1 | 8/2019 | Trombetta |

FOREIGN PATENT DOCUMENTS

| | | |
|---|---|---|
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

PCT Application No. PCT/US2019/015124 International Search Report and Written Opinion dated Apr. 15, 2019.

PCT Application No. PCT/US2019/016686 International Search Report and Written Opinion dated Apr. 10, 2019.

PCT Application No. PCT/US2019/016698 International Search Report and Written Opinion dated Apr. 11, 2019.

PCT Application No. PCT/US2019/016694 International Search Report and Written Opinion dated Apr. 15, 2019.

PCT Application No. PCT/US2019/017100 International Search Report and Written Opinion dated Apr. 17, 2019.

PCT Application No. PCT/US2018/013378 International Search Report and Written Opinion dated Mar. 8, 2018.

U.S. Appl. No. 15/450,602 Office Action dated Apr. 6, 2018.

PCT Application No. PCT/US2018/021197 International Search Report and Written Opinion dated May 30, 2018.

U.S Appl. No. 15/448,356, Steven Trombetta, System and Method for Managing Online Gaming League, filed Mar. 2, 2017.

PCT/US18/13378, System and Method for Managing Online Gaming League, filed Jan. 11, 2018.

U.S. Appl. No. 15/908,569, Chris Thielbar, Online Tournament Integration, Not Yet Assigned.

U.S. Appl. No. 15/908,722, Steven Trombetta, Statistical Driven Tournaments, Not Yet Assigned.

U.S. Appl. No. 15/908,635, Steven Trombetta, Statistically Defined Game Channels, Not Yet Assigned.

U.S. Appl. No. 15/908,531, Steven Trombetta, Integrating Commentary Content and Gameplay Content Over a Multi-User Platform, Not Yet Assigned.

U.S. Appl. No. 15/908,657, Steven Trombetta, De-Interleaving Gameplay Data, Not Yet Assigned.

U.S. Appl. No. 15/908,345, Steven Trombetta, Player to Spectator Handoff and Other Spectator Controls, Not Yet Assigned.

(56) References Cited

OTHER PUBLICATIONS

U.S. Appl. No. 15/908,704, Steven Trombetta, Scaled VR Engagement and Views in an E-Sports Event, Not Yet Assigned.
U.S. Appl. No. 15/908,712, Steven Trombetta, Discovery and Detection of Events in Interactive Content, Not Yet Assigned.
U.S. Appl. No. 15/908,707, Steven Trombetta, Creation of Winner Tournaments With Fandom Influence, Not Yet Assigned.
PCT Application No. PCT/US2019/015123 International Search Report and Written Opinion dated Apr. 23, 2019.
PCT Application No. PCT/US2019/015125 International Search Report and Written Opinion dated Apr. 23, 2019.
PCT Application No. PCT/US2019/016180 International Search Report and Written Opinion dated Apr. 23, 2019.
U.S. Appl. No. 15/450,602 Office Action dated Jun. 28, 2019.
U.S. Appl. No. 15/908,569 Office Action dated Jun. 28, 2019.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,704 Office Action dated Jun. 28, 2019.
U.S. Appl. No. 15/908,707 Office Action dated Jul. 17, 2019.
U.S. Appl. No. 15/448,356 Final Office Action dated Aug. 31, 2018.
U.S. Appl. No. 15/448,356 Office Action dated Jan. 8, 2019.
U.S. Appl. No. 15/450,602 Final Office Action dated Nov. 2, 2018.
PCT Application No. PCT/US2019/015275 International Search Report and Written Opinion dated Apr. 23, 2019.
U.S. Appl. No. 15/908,345 Office Action dated Jan. 10, 2020.
U.S. Appl. No. 15/448,356 Final Office Action dated Aug. 6, 2019.
U.S. Appl. No. 15/908,712 Office Action dated Aug. 8, 2019.
PCT Application No. PCT/US2018/013378 International Preliminary Report On Patentability dated Sep. 3, 2019.
PCT Application No. PCT/US2019/016167 International Search Report and Written Opinion dated Aug. 26, 2019.
U.S. Appl. No. 15/908,707 Final Office Action dated Nov. 18, 2019.
U.S. Appl. No. 15/448,356 Office Action dated Mar. 5, 2018.
PCT/US19/17100, Online Tournament Integration, filed Feb. 7, 2019.
PCT/US19/15120, Statistical Driven Tournaments, filed Jan. 25, 2019.
PCT/US19/15124, Statistically Defined Game Channels, filed Jan. 25, 2019.
PCT/US19/15273, Integrating Commentary Content and Gameplay Content Over a Multi-User Platform, filed Jan. 25, 2019.
PCT/US19/15275, De-Interleaving Gameplay Data, filed Jan. 25, 2019.
PCT/US18/16180, Incentivizing Players to Engage in Competitive Gameplay, filed Jan. 31, 2019.
PCT/US19/16167, Player to Spectator Handoff and Other Spectator Controls, filed Jan. 31, 2019.
PCT/US19/16694, Scaled VR Engagement and Views in an E-Sports Event, filed Feb. 5, 2019.
PCT/US19/16686, Discovery and Detection of Events in Interactive Content, filed Feb. 5, 2019.
PCT/US19/16698, Creation of Winner Tournaments with Fandom Influence, filed Feb. 5, 2019.
U.S. Appl. No. 15/450,602, Steven Trombeta, User-Driven Spectator Channel for Live Game Play in Multi-Player Games, filed Mar. 6, 2017.
PCT/US18/21197, User-Driven Spectator Channel for Live Game Play in Multi-Player Games, filed Mar. 6, 2017.
U.S. Appl. No. 16/681,477, Steven Trombetta, USER-Driven Spectator Channel for Live Game Play in Multi-Player Games, filed Nov. 12, 2019.
U.S. Appl. No. 16/681,477 Office Action dated Apr. 16, 2020.
U.S. Appl. No. 15/908,569 Office Action dated Mar. 27, 2020.

\* cited by examiner

INCENTIVIZING PLAYERS TO ENGAGE IN COMPETITIVE GAMEPLAY

BACKGROUND OF THE INVENTION

Field of the Invention

The present disclosure generally relates to multiplayer gameplay such as tournament gameplay accessible over a network, and more particularly, to incentivizing non-ranked players to engage in competitive gameplay.

Description of the Related Art

Modern technological advances in computing power, network connectivity, and the like, support a growing community of subscribers to online content hosted by a network platform. In the context of the video/entertainment industry, network platforms often engage with consumers through competitive gameplay (e.g., tournament-style gameplay) where a large number of players access game content hosted by the network platforms and compete against other players from all over the world. However, many content providers, ranging from large corporations to individuals, continuously generate large amounts of diverse content, which can inundate and overwhelm potential consumers and cause such consumers to disengage or ignore solicitations. Moreover, potential consumers of competitive gameplay can be particularly difficult to reach if they only participate in non-competitive gameplay (e.g., local gameplay, non-network gameplay, or non-ranked gameplay). Alternatively, some of these potential consumers may have prior poor experiences with competitive gameplay because of a mismatch of abilities/skills. Moreover, many potential consumers may not be aware of tournaments and/or may not appreciate the breadth (or growth) of their own skills as compared to other competitive players. Therefore, there is a need in the art to improve and incentivize consumer engagement with competitive gameplay hosted by a network platform.

SUMMARY OF THE PRESENTLY CLAIMED INVENTION

This disclosure generally describes techniques to incentivize non-ranked players to engage in competitive gameplay. In one exemplary embodiment, these techniques are described by a method that includes steps for measuring metrics for a plurality of players that engage in gameplay. The players can include, for example, ranked players and a non-ranked player and the metrics are often associated with specific players and are used to generate ranked profiles for ranked players and a non-ranked profile for the non-ranked player. The method also includes steps for mapping the ranked profiles and the non-ranked profile in a vector-space, where one metric corresponds to one dimension in the vector-space. Notably, the vector-space provides an important tool for analyzing player skills (e.g., based on respective profiles), comparing distances (e.g., positions) between ranked profiles and the non-ranked profile, and the like. The method further provides a step for presenting a notification to the non-ranked player based on a distance (in the vector-space) between the non-ranked profile and one or more ranked profiles. For example, the distance may be compared against a distance threshold, which can help indicate when the non-ranked player's skills are close to (or exceed) ranked player skills (e.g., based on respective profiles in the vector-space). Notably, the notification provides an incentive for the non-ranked player to engage in competitive gameplay and can include a projected or potential rank, an award, an invitation to play in a tournament, a head-to-head challenge with a ranked player, etc.

In another embodiment, a system employs the above discussed techniques to incentivize a non-ranked player to engage in competitive gameplay (e.g., gameplay hosted by a multiplayer platform over a network). For example, the system includes a network interface to communicate over one or more communication networks, a processor coupled to the network interface and adapted to execute one or more processes, and a memory configured to store a process executable by the processor. The system (e.g., the processor) executes the process and is operable to measure metrics for players that engage in gameplay, including ranked players and a non-ranked player. The process further generates ranked profiles for the ranked players, a non-ranked profile for the non-ranked player, and maps the ranked profiles and the non-ranked profile in a vector-space, which includes one dimension for one metric. The process further presents a notification that provides an incentive for the non-ranked player to engage in competitive gameplay based on a distance (in the vector-space) between the non-ranked profile and at least one ranked profile.

In yet another embodiment, a tangible, non-transitory, computer-readable media includes software with encoded instructions executable by a processor. The processor executes the instructions and is operable to measure metrics for players that engage in gameplay, including ranked players and a non-ranked player. The process further generates ranked profiles for the ranked players, a non-ranked profile for the non-ranked player, and maps the ranked profiles and the non-ranked profile in a vector-space, which includes one dimension for one metric. The process further presents a notification that provides an incentive for the non-ranked player to engage in competitive gameplay based on a distance (in the vector-space) between the non-ranked profile and at least one ranked profile.

DETAILED DESCRIPTION

As used herein, the term "user" refers to a user of an electronic device(s) and actions performed by the user in the context of computer software shall be considered to be actions to provide an input to electronic device(s) that cause the electronic device to perform steps or operations embodied in computer software. As used herein, the term "ranked" players refers to players who engage in competitive gameplay (e.g., tournaments) against other players over a network (e.g., typically hosted by a multiplayer platform). Ranked players achieve respective ranks or positions based on performance, which can be measured over a single game session, multiple game sessions (e.g., a season), for a specific game, or for a collection of games. The term "non-ranked" players refers to players who do not engage in the same competitive gameplay as the ranked players. The term "competitive gameplay" refers to multiplayer gameplay that counts toward a player's rank. The competitive gameplay is accessible over a network (e.g., typically hosted by a multiplayer platform). Completive gameplay involves players matching up against other players and includes individual matchups as well as team matchups.

As mentioned above, an ever-increasing quantity of accessible content as well as competition amongst content providers presents challenges to solicit competitive gameplay participation amongst potential consumers. Moreover, some potential consumers who only participate in non-competitive gameplay may be unaware of tournaments for competitive gameplay and/or may not appreciate the breadth of their own skills. Accordingly, this disclosure describes techniques to incentive consumer engagement in the context of competitive gameplay (e.g., multiplayer gameplay) hosted by a network platform.

Figure 1:
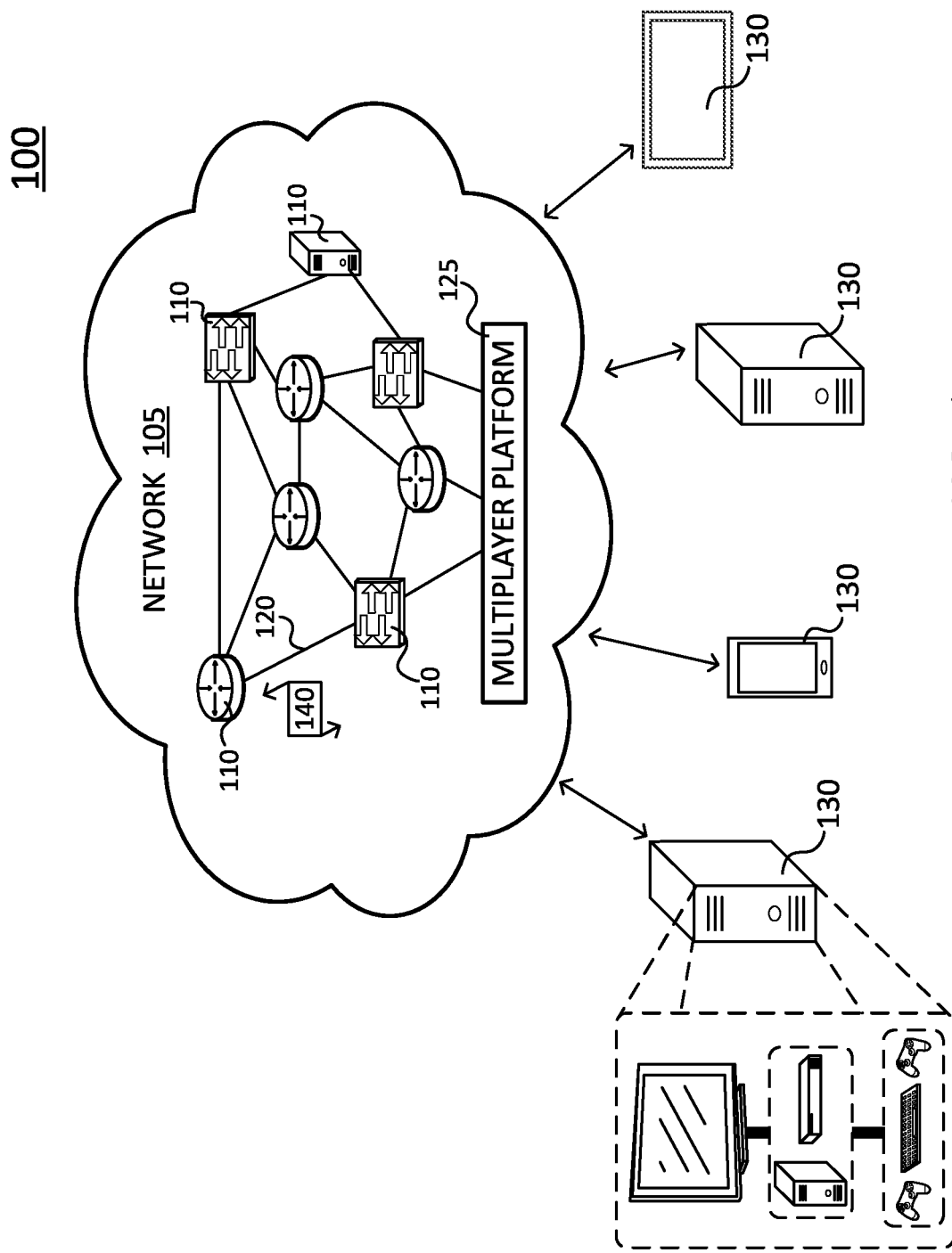
FIG. 1 illustrates a schematic diagram of an example communication network.

Referring now to the figures, FIG. 1 illustrates a schematic diagram 100 of an example communication network 105. Communication network 105 is shown for purposes of illustration and represents various types of networks, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Communication network 105 further includes a geographically distributed collection of devices or nodes 110, interconnected by communication links 120 for exchanging data such as data packets 140 and for transporting data to end nodes or client devices 130 through, for example, a multiplayer platform 125. Multiplayer platform 125 distributes media content (e.g., audio content, visual content, textual content, etc.) to subscribers such as client devices 130. Client devices 130 include personal computing devices, network game systems (e.g., game consoles, peripheral devices, display hardware, etc.), laptops, tablets, mobile devices, or other devices as is appreciated by those skilled in the art. In operation, a user connects to multiplayer platform 125 over network 105 and subscribes to content provided by multiplayer platform 125. In this fashion, the user can play, spectate, or otherwise access media content hosted by multiplayer platform 125.

Communication links 120 in network 105 include wired links or shared media links (e.g., wireless links, PLC links, etc.) where certain devices, such as, e.g., routers, servers, switches, sensors, computers, etc., may be in communication with other devices, based on distance, signal strength, current operational status, location, etc. Those skilled in the art will understand that any number of nodes, devices, links, etc. may be used in communication network 105, and that the view shown herein is for purposes of discussion and simplicity, not limitation.

Data packets 140 represent network traffic/messages exchanged between devices over and within communication network 105 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the devices or nodes interact with each other.

Figure 2:
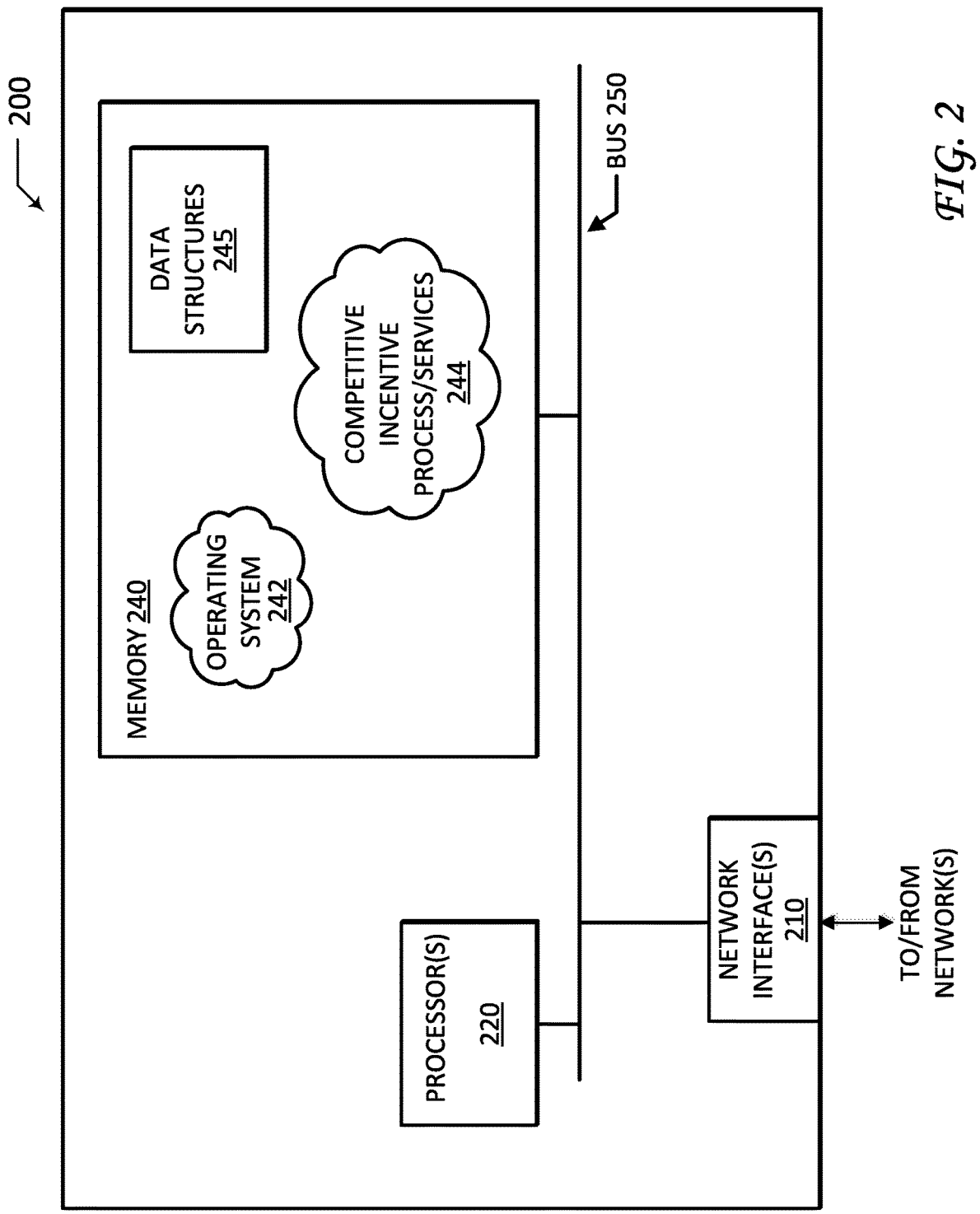
FIG. 2 illustrates a schematic diagram of an example network device.

FIG. 2 illustrates a block diagram of an example network device 200 that can be used in conjunction with multiplayer platform 125 (e.g., a component or sub-component of multiplayer platform 125) and/or in conjunction with one of client devices 130 (e.g., a game console system or components thereof). As shown, device 200 includes one or more network interfaces 210, at least one processor 220, and a memory 240 interconnected by a system bus 250.

Network interface(s) 210 contain the mechanical, electrical, and signaling circuitry for communicating data over links coupled to one or more of the networks shown in schematic diagram 100. Network interfaces 210 are configured to transmit and/or receive data using a variety of different communication protocols, as will be understood by those skilled in the art. Moreover, network interfaces 210 may include input interfaces for providing or receiving user inputs (e.g., from input devices such as touch screens, controller devices, and the like).

Memory 240 comprises a plurality of storage locations that are addressable by processor 220 for storing software programs and data structures associated with the embodiments described herein. Processor 220 comprises elements or logic adapted to execute the software programs and manipulate data structures 245. An operating system 242, portions of which are typically resident in memory 240 and executed by processor 220, functionally organizes device 200 by, inter alia, invoking operations in support of software processes and/or services executing on the device. These software processes and/or services may comprise an illustrative "competitive incentive" process/service 244. Note that while competitive incentive processes/services 244 are shown in centralized memory 240, these processes/services may be configured to operate in a distributed computing network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having competitive incentive process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
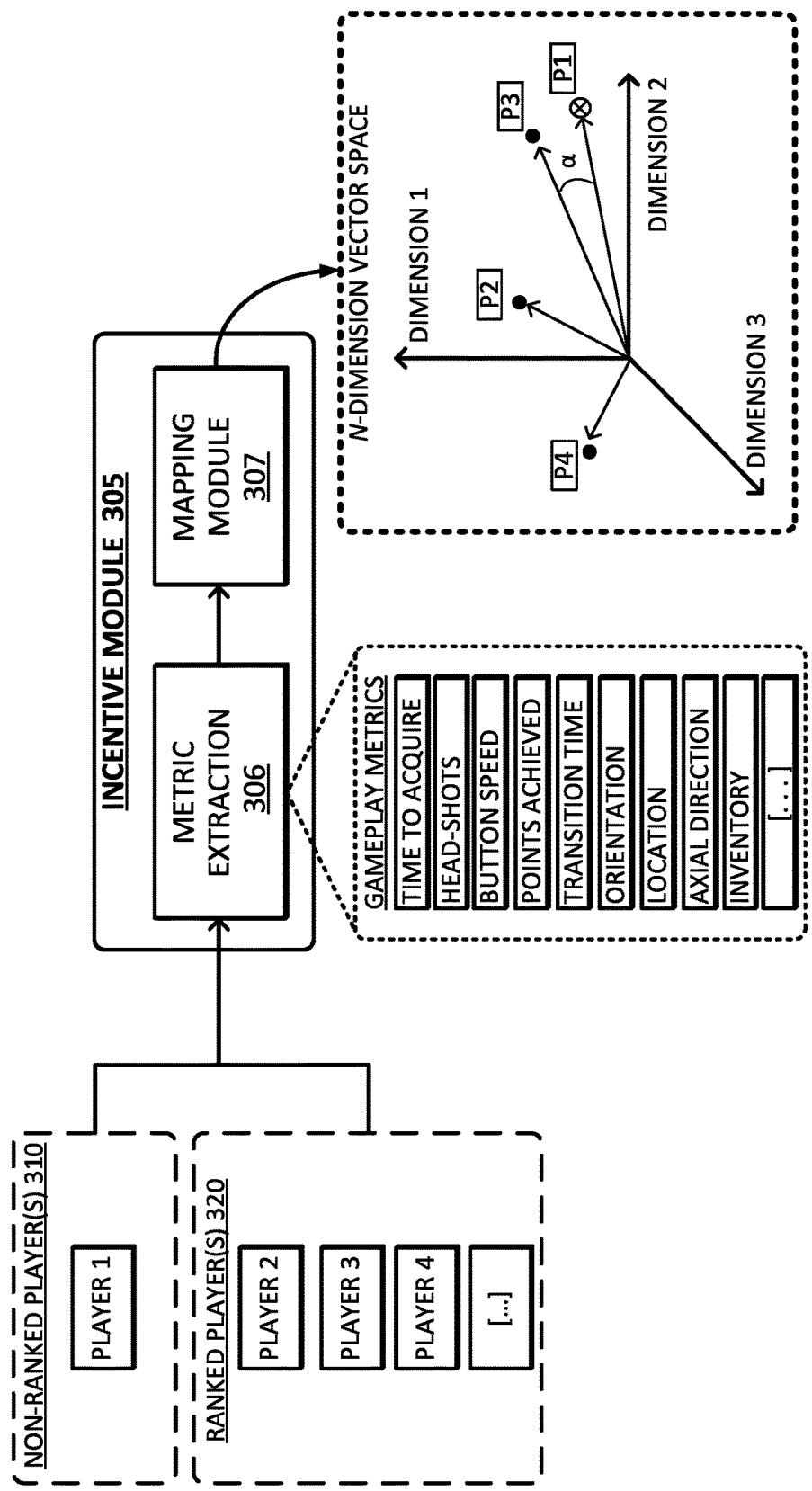
FIG. 3 illustrates a schematic diagram of an incentive module that monitors gameplay, extracts metrics for game sessions, and maps profiles in a vector-space based on respective metrics.

FIG. 3 illustrates a schematic diagram 300 of an incentive module 305. Incentive module 305 includes two sub-modules—namely, a metric extraction module 306 and a mapping module 307. Notably, incentive module 305 may represent components or sub-components of device 200 and/or multiplayer platform 125. For example, incentive module 305 may perform operations described by competitive incentive process/service 244.

In operation, metric extraction module 306 monitors gameplay (e.g., actions/interactions) for game sessions. In particular, metric extraction module 306 monitors gameplay corresponding to specific players, including non-ranked player 310 (player 1) as well as ranked players 320 (player 2, player 3, player 4, and so on). As mentioned above, the gameplay for ranked players 320 can include competitive gameplay (typically hosted by a multiplayer platform) and gameplay for non-ranked players 310 includes non-competitive gameplay such as local gameplay, non-network gameplay, or other non-ranked gameplay. Metric extraction module 306 operates in conjunction with metric extraction module 306 and extracts metrics such as "gameplay metrics" associated with game sessions. As shown, examples of gameplay metrics include a time to acquire a target (e.g., when a player or object is present in a frame), a number of head shots, a gameplay distance corresponding to successful headshots, a button press speed, a number of points achieved, a transition time between gameplay events or milestones, an orientation of a player and/or controller, a gameplay location (e.g., on a world map for the game session), an axial direction or angular momentum of a character in the gameplay session (and/or hardware controllers associated with a player), inventory, and so on. The gameplay metrics are typically extracted and organized according to each player, and can include real-world metrics measured by hardware (e.g., input controllers) or virtual metrics measured by actions, interactions, etc. by a character in a game session. Collectively, the gameplay metrics include a comprehensive data set that represents every move, action, interaction, and so on in a game session. Accordingly, the gameplay metrics can be used to recreate or simulate gameplay by a particular player in a subsequent game session (e.g., a non-competitive or competitive game session, as appropriate). For example, the gameplay metrics for a ranked player may be used to simulate a matchup against a non-ranked player in non-competitive game session such as a non-network game session, a local game session, a non-ranked game session, etc.

Mapping module 307 receives the gameplay metrics from metric extraction module 306 and creates profiles based on respective gameplay metrics. For example, mapping module 307 creates ranked profiles corresponding to ranked players 320 and a non-ranked profile corresponding to player 310, and maps these profiles in a vector-space (e.g., an n-dimensional vector-space). With respect to mapping the profiles, mapping module 307 determines vector-space positions for profiles corresponding to player 1 (P1), player 2 (P2), player 3 (P3), and player 4 (P4). Notably, the vector-space can include (or exclude) any number of axis where each axis corresponds to a gameplay metric. For example, dimension 1 corresponds to a first metric, dimension 2 corresponds to a second gameplay metric, dimension 3 corresponds to a third gameplay metric, and so on.

Incentive module 305 further analyzes, as discussed in greater detail below, the respective positions for profiles in the vector-space to determine relative distances (and/or position vectors with corresponding angles ($\alpha$)) and compares non-ranked profiles with ranked profiles.

Figure 4:
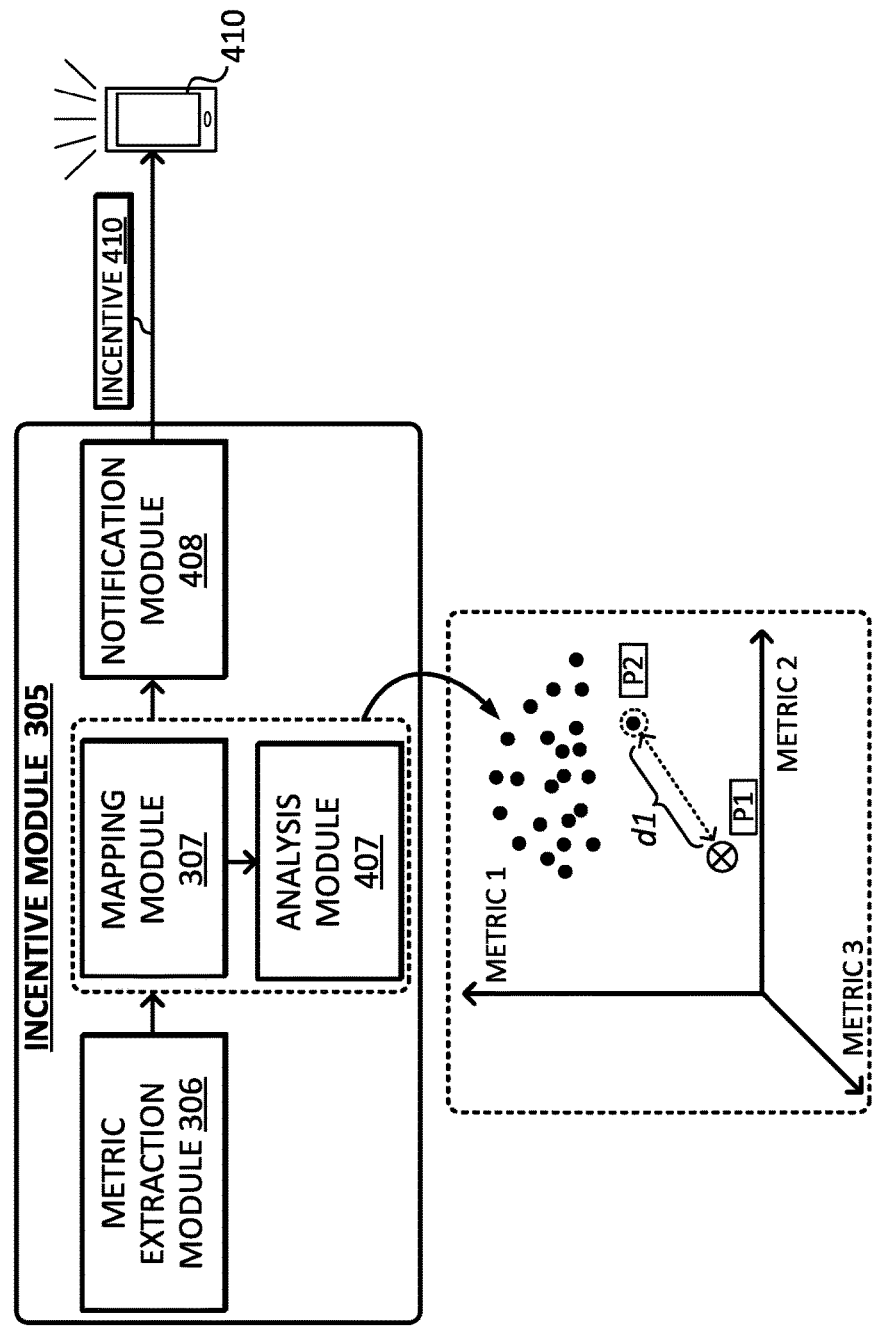
FIG. 4 illustrates a schematic diagram of the incentive module shown in FIG. 3, further showing additional sub-modules that compare ranked profiles with non-ranked profiles and provide notifications to incentivize non-ranked players to participate in competitive gameplay.

FIG. 4 illustrates a schematic diagram 400 of incentive module 305, further showing an analysis module 407, which operates in conjunction with mapping module 307, and a notification module 408, which provides notifications to incentivize non-ranked players to participate in competitive gameplay.

As discussed above, metric extraction module 306 extracts gameplay metrics and mapping module 307 maps profiles in a vector-space based on respective gameplay metrics. Here, analysis module 407 analyzes positions and determines distances between respective profiles. For example, analysis module 407 determines a distance "d1" between the profile P1 (corresponding non-ranked player 1) and the profile P2 (corresponding to ranked player 2). Notification module 408 further compares the distance d1 to a threshold distance and, when distance d1 is within the threshold distance, presents a notification to a client device 410 client associated with non-ranked player 1. Here, the notification is illustrated by an incentive 410, which solicits and/or provides an incentive for non-ranked player 1 to engage in competitive gameplay.

Put differently, incentive 410 represents a solicitation to incentivize non-ranked player 1 to engage in competitive gameplay with ranked players. Incentive 410 can include, for example, a gameplay challenge (e.g., an invitation) between non-ranked player 1 and a ranked player (e.g., here, ranked player 2), a tournament invitation, a schedule of one or more tournaments, a predicted rank for one or more game sessions of non-competitive gameplay (e.g., if non-ranked player 1 participated in competitive gameplay), a predicted award for one or more game sessions of competitive gameplay (e.g., a point award, a monetary award, a gift certificate, a voucher, a coupon, etc.), a subscription to a service or a game, and so on.

Figure 5:
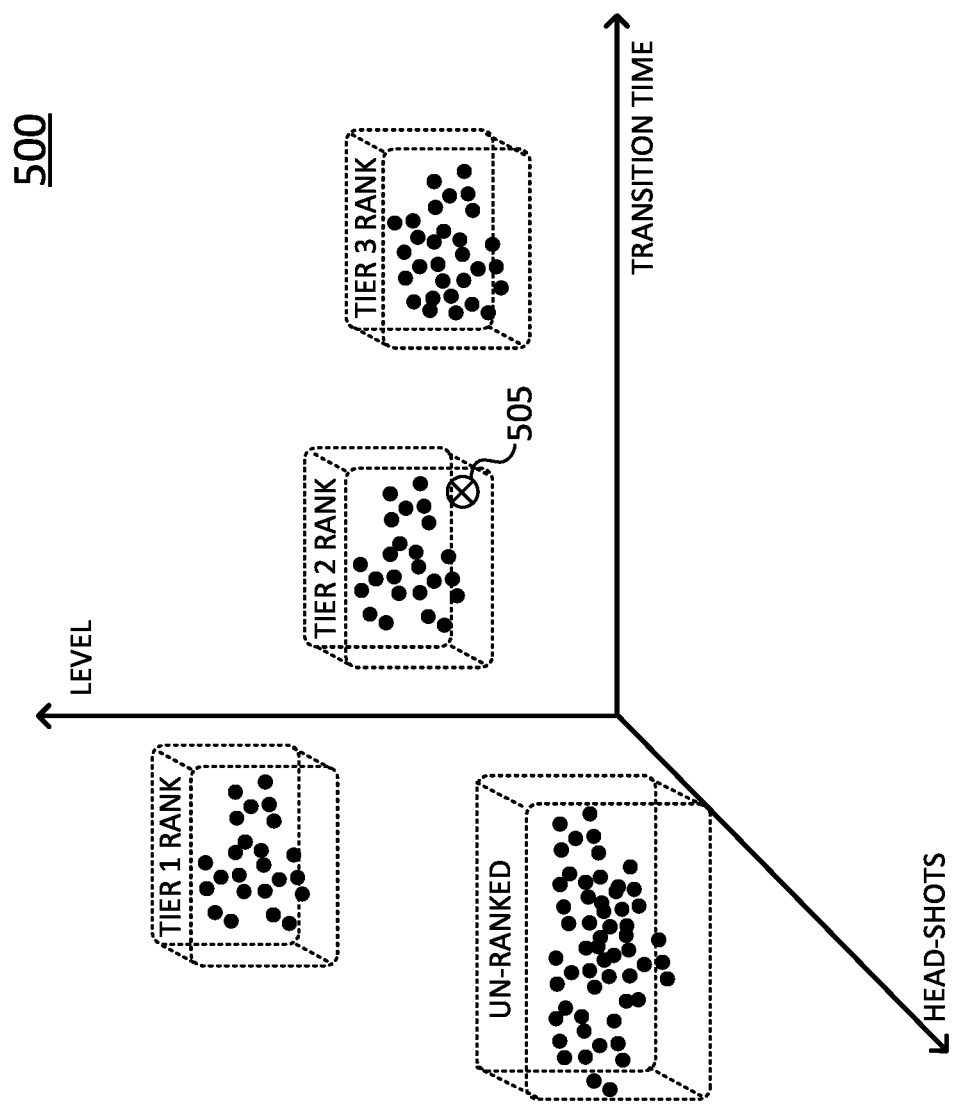
FIG. 5 illustrates a schematic diagram of a vector-space, showing positions for ranked and non-ranked profiles as well as groupings of ranked players into respective tiers.

FIG. 5 illustrates a schematic diagram 500 of a vector-space, showing respective positions for ranked profiles and a non-ranked profile as well as groupings of ranked players into tiers—here, "Tier 1", "Tier 2", "Tier 3", and "unranked". As shown, the vector-space includes dimensions corresponding to certain gameplay metrics such as "transition time", "head-shots", and "level" where one dimension corresponds to one gameplay metric. In addition, the vector-space also includes a non-ranked profile 505 in proximity to ranked profiles grouped in Tier 2.

Incentive module 305 creates the vector-space shown in schematic diagram 500 based on gameplay metrics associated with players. For example, incentive module 305 monitors gameplay for game sessions and extracts gameplay metrics for respective players (e.g., ranked and non-ranked players). Incentive module 305 further creates profiles and maps the profiles to respective positions in the vector-space. As illustrated, incentive module 305 analyzes positions for the profiles and determines a rank or grouping based on distances between the positions. In this fashion, profiles in relative proximity to each other are grouped into a tier.

Incentive module 305 further maps non-ranked profile 505 in the vector-space and determines its position is within the Tier 2 rank. For example, incentive module 305 may determine non-ranked profile 505 is within a threshold distance to one or more ranked profiles grouped in or associated with Tier 2. Alternatively, incentive module 305 may develop a group criteria that describes the ranked profiles within Tier 2 as a whole and compare a distance between the non-ranked profile 505 in the vector-space to the group criteria.

Figure 6:
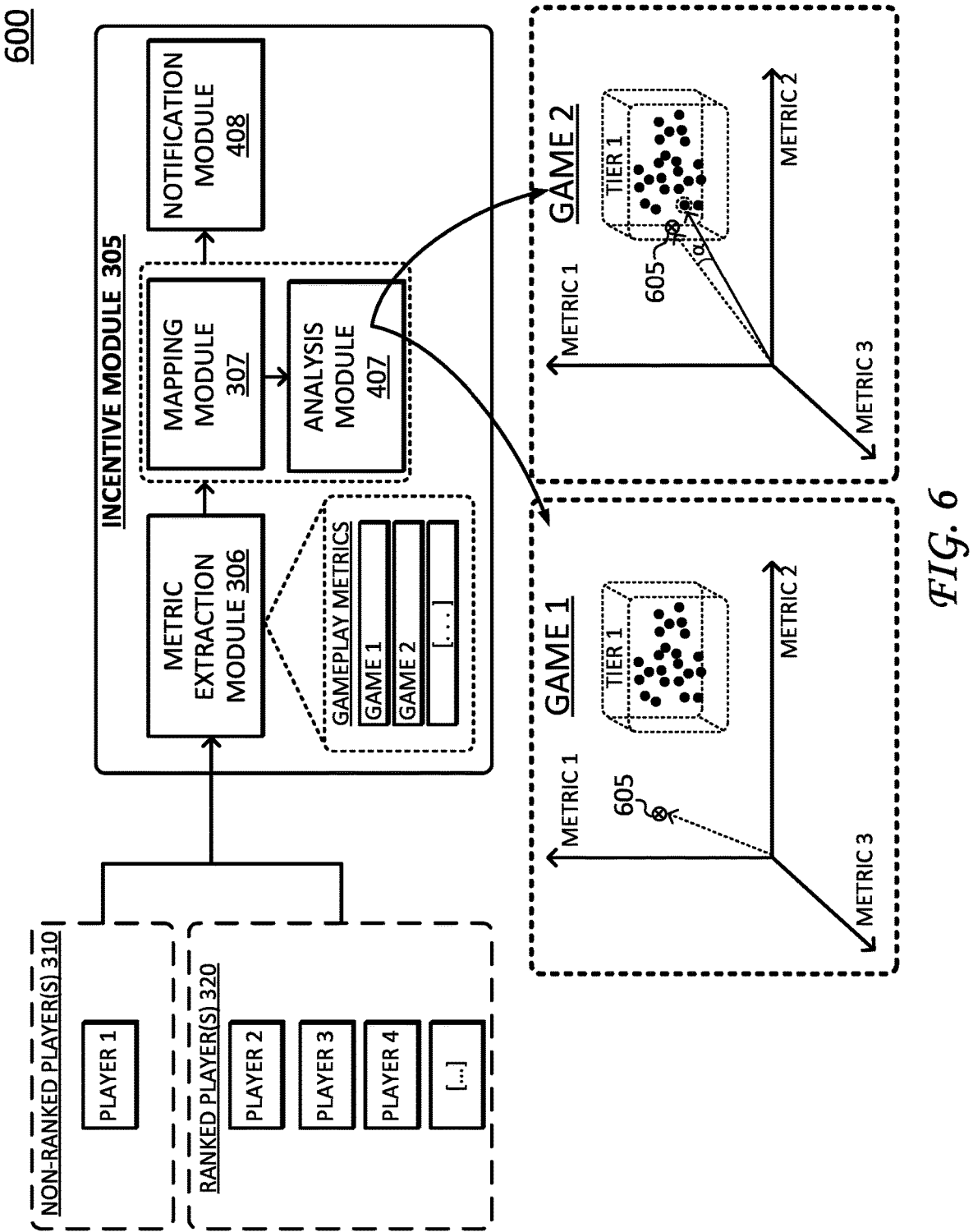
FIG. 6 illustrates a schematic diagram of the incentive module shown in FIG. 4, showing vector-spaces for different games.

FIG. 6 illustrates a schematic diagram 600 that shows vector-spaces for a first game—"Game 1"—and a vector-space for a second game—"Game 2". As shown, incentive module 305 performs the above-discussed operations, extracts gameplay metrics, creates vector-spaces, and maps profiles for each game. A non-ranked profile 605 mapped in the vector-space for Game 1 does not fall within a threshold distance of the Tier 1 group criteria and/or any ranked profiles associated with the Tier 1 group. However, this non-ranked profile 605 is within the threshold distance of the Tier 1 group criteria (and/or one or more ranked profiles associated with the Tier 1 group) in the vector-space Game 2, which uses the same gameplay metrics for the same dimensions. That is, certain gameplay metrics may be advantageous for one game, but may hinder success in another game.

Moreover, in some instances, the player associated with non-ranked profile 605 may not have played Game 2 (e.g., may not have engaged in gameplay for game sessions associated with Game 2). In these instances, incentive module 305 can discover new games (here Game 2) that may interest the player associated with non-ranked profile 605 and provide a recommendation regarding potential interest to the non-ranked player associated with non-ranked profile 605. For example, incentive module 305 may determine the gameplay metrics for non-ranked profile 605 may lead to success in another game based on the proximity of non-ranked profile 605 to ranked profiles associated with successful players in Game 2. In turn, incentive module 305 may provide a notification (e.g., using notification module 408) to the player associated with the non-ranked profile 605 and recommend Game 2. The notification can include, for example, an incentive regarding a potential rank, suitable skillset, awards, and so on, for competitive gameplay in Game 2.

Figure 7:
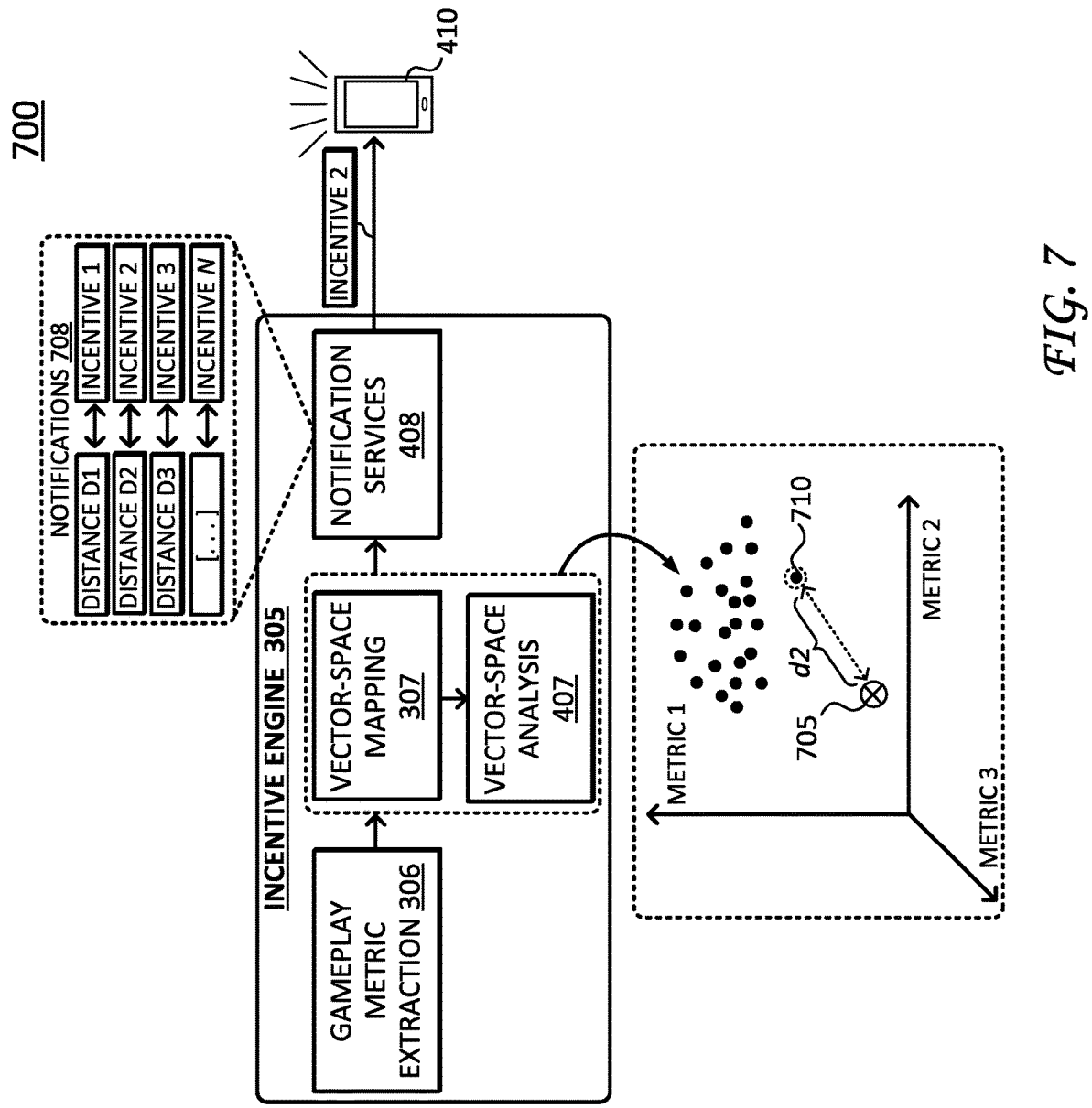
FIG. 7 illustrates a schematic diagram of the incentive module shown in FIG. 3, showing a selection of incentives in a notification based on distances between profiles in a vector-space.

FIG. 7 illustrates a schematic diagram 700 of incentive module 305, showing a selection of incentives in a notification based on distances between the profiles in the vector-space. In particular, schematic diagram 700 illustrates operations by incentive module 305 to select different incentives to present to client device 410. Here, incentive module 305 determines a distance (d2) between a non-ranked profile 705 and a ranked profile 710. Incentive module 305 further selects an incentive—"incentive 2" based on distance (d2) and sends a notification to client device 410 with incentive 2.

In this fashion, incentive module 305 can map different incentives to different distance thresholds in the vector-space and provide incentives based on the same. For example, as the non-ranked profile 705 approaches or becomes closer to ranked profile 710, the incentives may change to further encourage the non-ranked player to engage in competitive gameplay.

Figure 8:
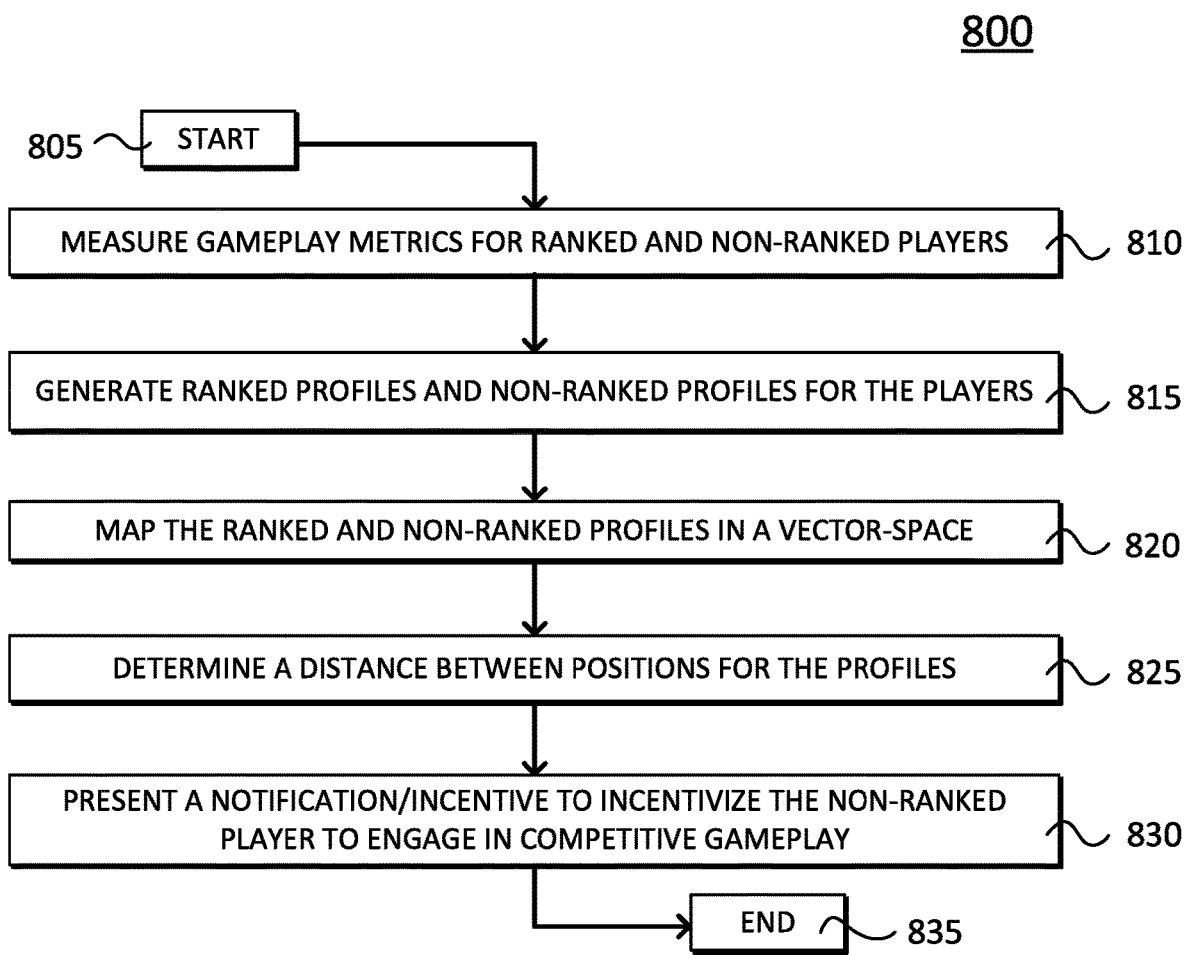
FIG. 8 illustrates an example simplified procedure for incentivizing competitive gameplay.

FIG. 8 illustrates an example simplified procedure 800 for incentivizing competitive gameplay for non-ranked players, particularly from the perspective of an incentive module such as incentive module 305. While procedure 800 describes operations performed by incentive module 305, it is appreciated such operations are not intended to be limited to incentive module 305—it is appreciated such operations may be performed by portions of the incentive module and/or by other devices such as game consoles, network game systems, multiplayer platforms, and the like.

Procedure 800 begins at step 805 and continues to step 810 where, as discussed above, the incentive module measures metrics (e.g., gameplay metrics) for players engaged in gameplay (e.g., competitive gameplay, non-competitive gameplay, etc.). The incentive module further generates, at step 815, profiles based on the metrics for each player. For example, the profiles can include ranked profiles for ranked players and non-ranked profiles for non-ranked players.

The incentive module also maps, at step 820, the profiles for corresponding players in a vector-space. Here, the vector-space can include dimensions for corresponding metrics where one dimension corresponds to one metric. In addition, as mentioned above, the incentive module can also define tiers (e.g., Tier 1, Tier 2, etc.) or groups for co-located or proximately located ranked profiles in the vector-space.

The incentive module analyzes and determines, at step 825, relative distances (and/or angles between vectors) between the non-ranked profile and one or more ranked profiles in the vector-space. The incentive module may also compare the relative distances to a distance threshold to determine when the non-ranked profile is proximately located to a ranked profile. When the distance between the non-ranked profile and one or more ranked profiles (and/or criteria describing a tier) is within the distance threshold, the incentive module further presents, at step 830, a notification to the non-ranked player to incentive the non-ranked player to engage in competitive gameplay. For example, the incentive can be in various forms such as a gameplay challenge between the non-ranked player and the ranked player(s), a tournament invitation for the non-ranked player, a schedule of one or more tournaments, a predicted rank (either a global rank or a rank for a particular game session of competitive gameplay), a predicted award for one or more game sessions of competitive gameplay, and so on. Procedure 800 subsequently ends at step 835, but may continue on to step 810 where the incentive module measures gameplay metrics for players.

It should be noted some steps within procedures 800 may be optional, and further the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide incentives to encourage non-ranked players to engage in competitive gameplay. While there have been shown and described illustrative embodiments to provide incentives based on vector-space positions of corresponding profiles, it is to be understood that various other adaptations and modifications may be made within the spirit and scope of the embodiments herein. For example, the embodiments have been shown and described herein with relation to certain systems, platforms, devices, and/or modules performing specific operations. However, the embodiments in their broader sense are not as limited, and may, in fact, such operations and similar functionality may be performed by any combination of the devices shown and described.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for incentivizing competitive gameplay, the method comprising:
   receiving gameplay data from a plurality of players in a multiplayer network, the gameplay data received from respective player devices over a communication network, the players including ranked players and a non-ranked player;
   evaluating metrics for each of the plurality of players based on the respective gameplay data;
   generating ranked profiles for the ranked players based on the metrics;
   generating a non-ranked profile for the non-ranked player based on the metrics;
   mapping the ranked profiles and the non-ranked profile in a vector-space, wherein one metric corresponds to one dimension in the vector-space;
   presenting a notification to the non-ranked player based on a distance in the vector-space between the non-ranked profile and at least one ranked profile, wherein the notification provides an incentive for the non-ranked player to engage in competitive gameplay;
   defining at least one tier to group a portion of the ranked players in the vector-space based on relative positions of the ranked profiles for the portion of the ranked players; and
   determining the distance in the vector-space between the non-ranked profile and the at least one ranked profile, wherein presenting the notification further comprises presenting the notification to indicate a potential rank corresponding to the at least one tier when the distance in the vector-space is within a threshold distance.

2. The method of claim 1, further comprising mapping different incentives to different distance thresholds in the vector-space.

3. The method of claim 1, wherein evaluating the metrics for the plurality of players further comprises:
   measuring the metrics for the ranked players that engage in network gameplay; and
   measuring the metrics for the non-ranked player that engages in non-network gameplay.

4. The method of claim 1, wherein the metrics include ranked metrics for the ranked players that engage in network gameplay, and further comprising:
   simulating the network gameplay in a non-network game session based on the ranked metrics; and
   hosting the non-networked game session for the non-ranked player.

5. The method of claim 4, wherein evaluating the metrics for the plurality of players further comprises measuring the metrics for the non-ranked player in the non-networked game session.

6. The method of claim 1, wherein the metrics include ranked metrics for gameplay associated with a first game and a second game and non-ranked metrics for gameplay associated with the first game, wherein the vector-space includes a first vector-space associated with the first game and a second vector-space associated with the second game, wherein mapping the ranked profiles and the non-ranked profile further comprises mapping the non-ranked profile in the second vector-space based on non-ranked metrics for gameplay associated with the first game.

7. The method of claim 6, further comprising providing a recommendation to the non-ranked player regarding the second game based on a distance in the second vector-space between the non-ranked profile and at least one ranked profiles.

8. The method of claim 1, wherein at least a portion of the gameplay is associated with one or more game sessions hosted over a network by a multiplayer platform.

9. The method of claim 1, wherein the incentive includes at least one of a gameplay challenge between the non-ranked player and at least one ranked player, a tournament invitation for the non-ranked player, a schedule of one or more tournaments, a predicted rank for one or more game sessions of competitive gameplay, a predicted award for one or more game sessions of competitive gameplay, a monetary award, or a subscription to one or more competitive gameplay sessions.

10. The method of claim 1, wherein the incentive includes a first incentive and a second incentive different from the first incentive, and further comprising:
    assigning the first incentive to a first threshold distance;
    assigning the second incentive to a second threshold distance;
    determining the distance in the vector-space between the non-ranked profile and at least one ranked profile is within the first threshold distance; and
    selecting the first incentive to present in the notification.

11. A system for incentivizing competitive gameplay, the system comprising:
    a network interface to communicate over one or more communication networks, wherein the network interface receives gameplay data from a plurality of players in a multiplayer network, the gameplay data received from respective player devices over a communication network, the players including ranked players and a non-ranked player; and
    a processor that executes instructions stored in memory, wherein the processor executes instructions to:
        evaluate metrics for a plurality of players based on the respective gameplay data;
        generate ranked profiles for the ranked players based on the metrics;
        generate a non-ranked profile for the non-ranked player based on the metrics;
        map the ranked profiles and the non-ranked profile in a vector-space, wherein one metric corresponds to one dimension in the vector-space;
        generate a notification to the non-ranked player based on a distance in the vector-space between the non-ranked profile and at least one ranked profile, wherein the notification provides an incentive for the non-ranked player to engage in competitive gameplay;
        define at least one tier to group a portion of the ranked players in the vector-space based on relative positions of the ranked profiles for the portion of the ranked players; and
        determine the distance in the vector-space between the non-ranked profile and the at least one ranked profile, wherein presenting the notification comprises indicating a potential rank corresponding to the at least one tier when the distance in the vector-space is within a threshold distance.

12. The system of claim 11, wherein the processor executes further instructions to map different incentives to different distance thresholds in the vector-space.

13. The system of claim 11, wherein the processor executes further instructions to:
    measure the metrics for the ranked players that engage in network gameplay; and
    measure the metrics for the non-ranked player that engages in non-network gameplay.

14. The system of claim 11, wherein the metrics include ranked metrics for the ranked players that engage in network gameplay, and wherein the processor executes further instructions to:
    simulate the network gameplay in a non-network game session based on the ranked metrics; and
    host the non-networked game session for the non-ranked player.

15. The system of claim 14, wherein the processor evaluates the metrics for the plurality of players by measuring the metrics for the non-ranked player in the non-networked game session.

16. The system of claim 11, wherein at least a portion of the gameplay is associated with one or more game sessions hosted over a network by a multiplayer platform.

17. The system of claim 11, wherein the incentive includes a first incentive and a second incentive different from the first incentive, and wherein the processor executes further instructions to:
    assign the first incentive to a first threshold distance
    assign the second incentive to a second threshold distance;
    determine profile is within the first threshold distance; and
    select the first incentive to present in the notification.

18. A non-transitory, computer-readable storage medium, having instructions encoded thereon, the instructions executable by a processor to perform a method for incentivizing competitive gameplay, the method comprising:
    receiving gameplay data from a plurality of players in a multiplayer network, the gameplay data received from respective player devices over a communication network, the players including ranked players and a non-ranked player;
    evaluating metrics for each of the plurality of players based on the respective gameplay data;
    generating ranked profiles for the ranked players based on the metrics;
    generating a non-ranked profile for the non-ranked player based on the metrics;
    mapping the ranked profiles and the non-ranked profile in a vector-space, wherein one metric corresponds to one dimension in the vector-space;
    presenting a notification to the non-ranked player based on a distance in the vector-space between the non-ranked profile and at least one ranked profile, the notification providing an incentive for the non-ranked player to engage in competitive gameplay, wherein presenting a notification indicates a potential rank corresponding to the at least one tier when the distance in the vector-space is within a threshold distance;
    defining at least one tier to group a portion of the ranked players in the vector-space based on relative positions of the ranked profiles for the portion of the ranked players; and
    determining the distance in the vector-space between the non-ranked profile and the at least one ranked profile.

19. The non-transitory, computer-readable storage medium of claim 18, further comprising instructions executable to map different incentives to different distance thresholds in the vector-space.

20. The non-transitory, computer-readable storage medium of claim 18, wherein at least a portion of the gameplay is associated with one or more game sessions hosted over a network by a multiplayer platform.

* * * * *